US009802638B1

(12) United States Patent
Stoffel et al.

(10) Patent No.: US 9,802,638 B1
(45) Date of Patent: Oct. 31, 2017

(54) REMOVABLE MANUAL CONTROLS FOR AN AUTONOMOUS VEHICLE

(71) Applicant: Waymo LLC, Mountain View, CA (US)

(72) Inventors: Christopher John Stoffel, Menlo Park, CA (US); Brian Douglas Cullinane, Palo Alto, CA (US); Nathaniel Fairfield, Mountain View, CA (US); Alex Khaykin, San Francisco, CA (US); Brian Torcellini, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/087,118

(22) Filed: Mar. 31, 2016

Related U.S. Application Data (60) Provisional application No. 62/181,896, filed on Jun. 19, 2015.

(51) Int. Cl.
 *B62D 1/26* (2006.01)
 *B62D 1/22* (2006.01)
 (Continued)

(52) U.S. Cl.
 CPC ............. *B62D 1/26* (2013.01); *B62D 1/22* (2013.01); *G05D 1/0088* (2013.01); *G05G 1/34* (2013.01); *G05D 2201/0212* (2013.01)

(58) Field of Classification Search
 CPC ... B62D 1/22; B62D 1/26; B62D 1/28; B62D 1/283; B62D 1/286; G05G 1/34;
 (Continued)

(56) References Cited

U.S. PATENT DOCUMENTS 2,395,280 A * 2/1946 Law .................. G05G 1/34
 180/322
2,584,636 A * 2/1952 Sprinkel ............. B62D 1/22
 74/493

(Continued)

FOREIGN PATENT DOCUMENTS

DE 102013003214 A1 9/2013
JP 07010011 A * 1/1995

OTHER PUBLICATIONS

Google Official Blog, "Green Lights for our Self-Driving Vehicle Prototypes," 6 pgs., (May 2015).

(Continued)

*Primary Examiner* — Laura Freedman
(74) *Attorney, Agent, or Firm* — Lerner, David, Littenberg, Krumholz & Mentlik, LLP (57) ABSTRACT

Aspects of the present disclosure relate to a vehicle for maneuvering a passenger to a destination autonomously. The vehicle includes a computing system and a set of user input buttons for communicating requests to stop the vehicle and to initiate a trip to the destination with the computing system The vehicle has no steering wheel and no user inputs for the steering, acceleration, and deceleration of the vehicle other than the set of user input buttons. In order to safely test the vehicle, a removable manual control system may be used. The system may include a housing having an electronic connection to a computing system of the vehicle. The housing includes a steering input configured to allow a passenger to control the direction of the vehicle. The system also includes one or more computing devices configured to receive input from the steering input and send instructions the computing system.

20 Claims, 12 Drawing Sheets

(51) Int. Cl.
*G05G 1/34* (2008.04)
*G05D 1/00* (2006.01)

(58) Field of Classification Search
CPC ............ G05D 1/021; G05D 2201/0212; Y10T 74/20207; Y10T 74/20256; Y10T 74/20396; Y10T 74/20528; B60L 2260/32; B65G 1/065
See application file for complete search history.

(56) References Cited

U.S. PATENT DOCUMENTS

| | | | | |
|---|---|---|---|---|
| 2,791,915 | A * | 5/1957 | Merry | B62D 1/22 180/322 |
| 2,819,627 | A * | 1/1958 | Larson | G05G 1/305 74/562.5 |
| 3,943,795 | A * | 3/1976 | Kenney | B60T 7/06 74/479.01 |
| 5,469,356 | A * | 11/1995 | Hawkins | G01C 21/26 318/591 |
| 6,360,149 | B1 * | 3/2002 | Kwon | B60K 35/00 114/144 R |
| 7,894,951 | B2 * | 2/2011 | Norris | H04L 67/12 180/443 |
| 8,237,389 | B2 | 8/2012 | Fitch et al. | |
| 8,260,482 | B1 * | 9/2012 | Szybalski | B62D 1/286 701/23 |
| 8,812,186 | B2 | 8/2014 | Oh et al. | |
| 8,874,305 | B2 * | 10/2014 | Dolgov | G05D 1/0055 701/25 |
| 9,194,168 | B1 * | 11/2015 | Lu | E05F 15/70 |
| 9,342,074 | B2 * | 5/2016 | Dolgov | B60W 30/00 |
| 9,436,182 | B2 * | 9/2016 | Nemec | G05D 1/0055 |

OTHER PUBLICATIONS

UPM, "Autosteering Equipment for Automatically Controlling the Steering of Vehicle," 3 pgs. (Jun. 2012).

* cited by examiner

REMOVABLE MANUAL CONTROLS FOR AN AUTONOMOUS VEHICLE

CROSS-REFERENCE TO RELATED APPLICATIONS

The present application claims the benefit of the filing date of U.S. Provisional Patent Application No. 62/181,896 filed Jun. 19, 2015, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination. Given the nature of these vehicles, testing the vehicle on public roadways in as safe a way as possible is important to ensure safe operation of such vehicles for end users.

BRIEF SUMMARY

One aspect of the disclosure provides a removable manual control system for testing an autonomous vehicle. The system includes a removable housing configured to be mounted proximate to one or more seats in a vehicle having an autonomous driving mode. The removable housing has an electronic connection to a computer system of an autonomous vehicle having an autonomous driving mode. A steering input mounted in the removable housing and oriented proximate to a horizontal plane. The steering input is configured to allow a passenger to control the direction of movement of the autonomous vehicle in a manual driving mode. The removable manual control system also includes one or more computing devices configure to receive input from the steering input and send corresponding instructions to the computing system of the autonomous vehicle.

In one example, the removable housing is positioned on a base structure that connects to a floor of the vehicle by a set of removable fasteners. In this example, the removable housing is movable relative to the base structure in a horizontal direction and also a vertical direction. In another example, the removable housing has at least one emergency stopping button redundant to an emergency stopping button of the autonomous vehicle. In another example, the removable housing is configured to rest above the emergency stopping button of the autonomous vehicle. In another example, the removable housing further includes a screen for displaying information to the passenger. In another example, the removable manual control system also includes a removable pedal assembly configured to allow a passenger to control the speed of the vehicle. In this example, the removable pedal assembly is configured to connect to the interior of vehicle by a set of removable fasteners. In another example, the removable manual control system also includes a hand held wand configured to allow a passenger to control turn signals of the autonomous vehicle. In another example, the removable manual control system also includes a hand held wand configured to allow a passenger to activate the manual driving mode. In this example, the hand held wand is further configured to allow a passenger to activate the autonomous driving mode. In another example, the steering input is a steering wheel having a knob that allows a passenger to manipulate the position of the steering wheel.

A further aspect of the disclosure provides an autonomous vehicle having an autonomous driving mode. The vehicle includes no permanent steering wheel and no user inputs for the steering, acceleration, and deceleration of the vehicle other than a set of user input buttons. The vehicle also includes a removable manual control system for testing the autonomous vehicle, the removable manual control system having steering, acceleration, and braking inputs.

In one example, the vehicle also includes two seats and the removable manual control system includes a housing for the steering input. The housing is placed proximate to one or more seats. In this example, the removable housing is positioned on a base structure that connects to a floor of the vehicle by a set of removable fasteners. In addition, the housing is movable relative to the base structure in a horizontal direction and also a vertical direction. In another example, the set of user input buttons includes an emergency stopping button and the housing has at least one emergency stopping button redundant to the emergency stopping button. In this example, the housing is configured to rest above the emergency stopping button of the autonomous vehicle. In another example, the removable manual control system further includes a removable pedal assembly in which the acceleration and braking inputs are mounted. In this example, the removable pedal assembly is configured to connect to the interior of vehicle by a set of removable fasteners.

DETAILED DESCRIPTION

The technology relates to a vehicle for maneuvering a passenger to a destination, for example taking a trip, autonomously. The vehicle may include various user inputs for initiating as well as terminating such trips. In one example, the vehicle may include various buttons that can be used to communicate requests from a passenger to the vehicle's computers in order to initiate a trip, pull the vehicle over, or initiate an emergency stop. These buttons may therefore obviate the need for typical vehicle inputs such as a steering wheel, brake or acceleration pedals, or such inputs that would provide the passenger with direct communication with the vehicle's drive train or direct control over the steering, acceleration, or braking of the vehicle.

Given the nature of the vehicle, testing the functions of the vehicle on public roadways is an important step to ensuring the safety of the vehicle for end users. In order to safely test a vehicle having no steering wheel, acceleration or braking pedals, aspects of the disclosure provide a removable manual control system which may be used to give a passenger the ability to take over control of the vehicle in an emergency or where the passenger would otherwise be concerned about the actions of the vehicle. The removable nature allows for the testing of a vehicle without requiring permanent modifications to the vehicle which would not necessarily be aesthetically pleasing to an end user. In this regard, vehicles used for testing may be configured substantially identically to those used by end users and may even be put to use for end users after such testing.

The removable manual control system may include a steering wheel to enable a passenger to control the orientation of the vehicle's wheels. In addition, the removable manual control system may also include brake and acceleration pedals that enable a passenger to control the speed of the vehicle. The removable manual control system also includes one or more computing devices configured to receive input from the steering wheel and/or pedals and send information to the vehicle's control computer. A hand-held wand may also provide a passenger with additional controls such as turn signals, buttons for switching the manual or autonomous mode on and off, and a horn.

The steering wheel may be mounted in a steering wheel housing. When installed in the vehicle, the housing and base structure may be placed such that the housing is proximate to, such as directly in front of a passenger seat of the vehicle, directly adjacent to (such as to the left or right of) a passenger seat, between two passenger seats, at least partially between two passenger seats, or any location near a passenger seat that allows a passenger to comfortably reach user inputs of the steering wheel housing. Given the placement of the housing, the steering wheel may be considered a center-mounted steering wheel.

The steering wheel may be arranged to be generally horizontally or within some small angle from a horizontal plane. This may provide for a more comfortable positioning of the passenger's arm when controlling the steering wheel and avoids the passenger having to hold his or her arm at an angle during the testing or bumping into the seats of the vehicle when turning the steering wheel. In addition, given the center mounted positioning and the angle of the steering wheel, the steering wheel may also include a ball, knob, peg, or other protrusion to allow a passenger to more easily manipulate the steering wheel.

Because the vehicle is not adjustable, for example, the passenger seats are stationary, to increase the comfort of the passenger, the placement of the housing may be adjusted up and down as well as front and back (relative to the vehicle). The actual placement of the housing over the console of the vehicle may make activation of some of the buttons of the console, and most importantly, the emergency stopping button difficult or inconvenient for passengers of the vehicle. Because of this, the housing may include redundant buttons which duplicate all of some of the features of the buttons of the console.

When installed in a vehicle, the removable manual control system may be configured to receive input from the steering wheel, pedals and wand and send information to the vehicle's control computer. In response, the vehicle's control computer may send commands or otherwise control the aspects of the vehicle according to the inputs in an emergency manual driving mode.

Figure 1:
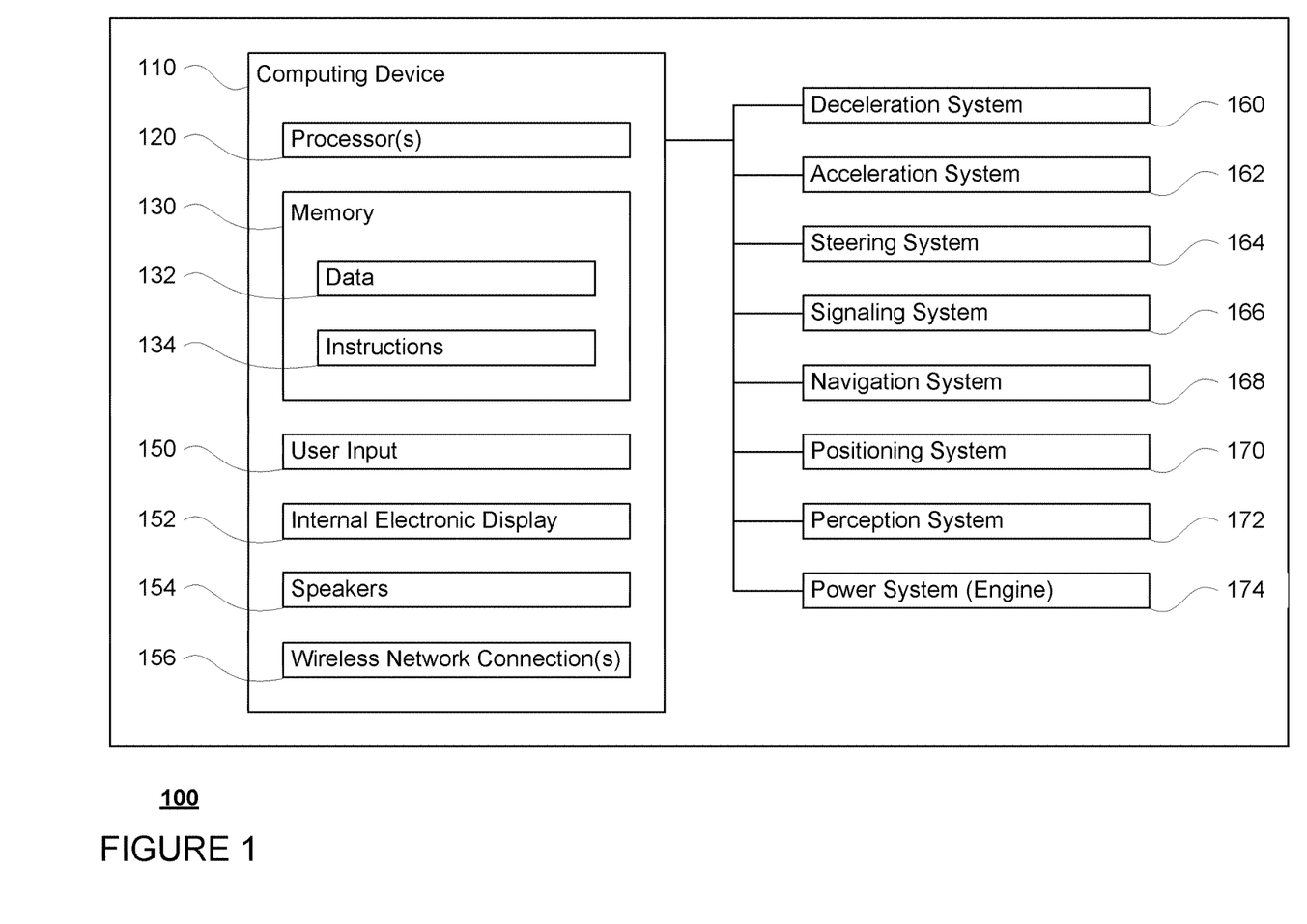
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 134 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the detailed map information and navigation system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

Figure 2:
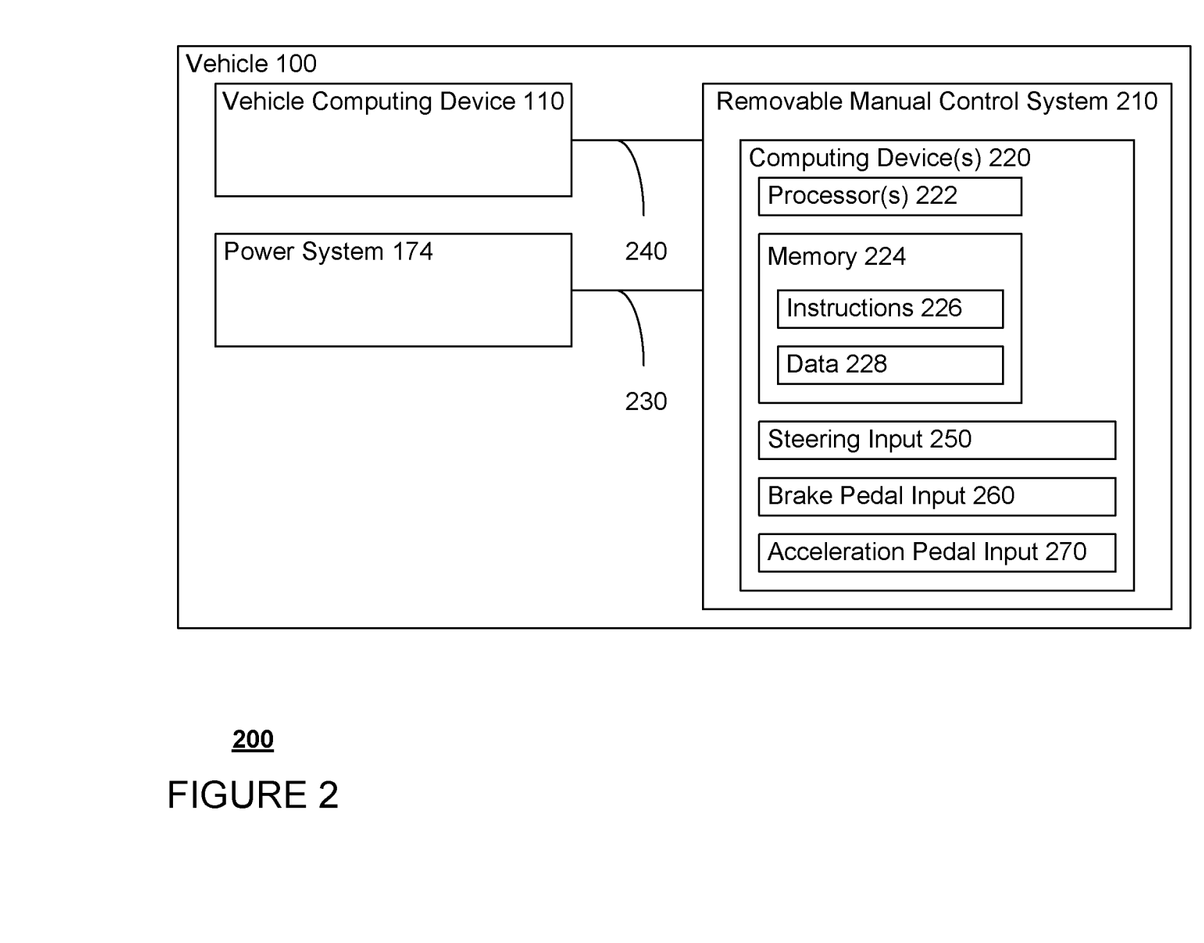
FIG. 2 is a functional diagram of an example system in accordance with an exemplary embodiment.
Figure 3A:
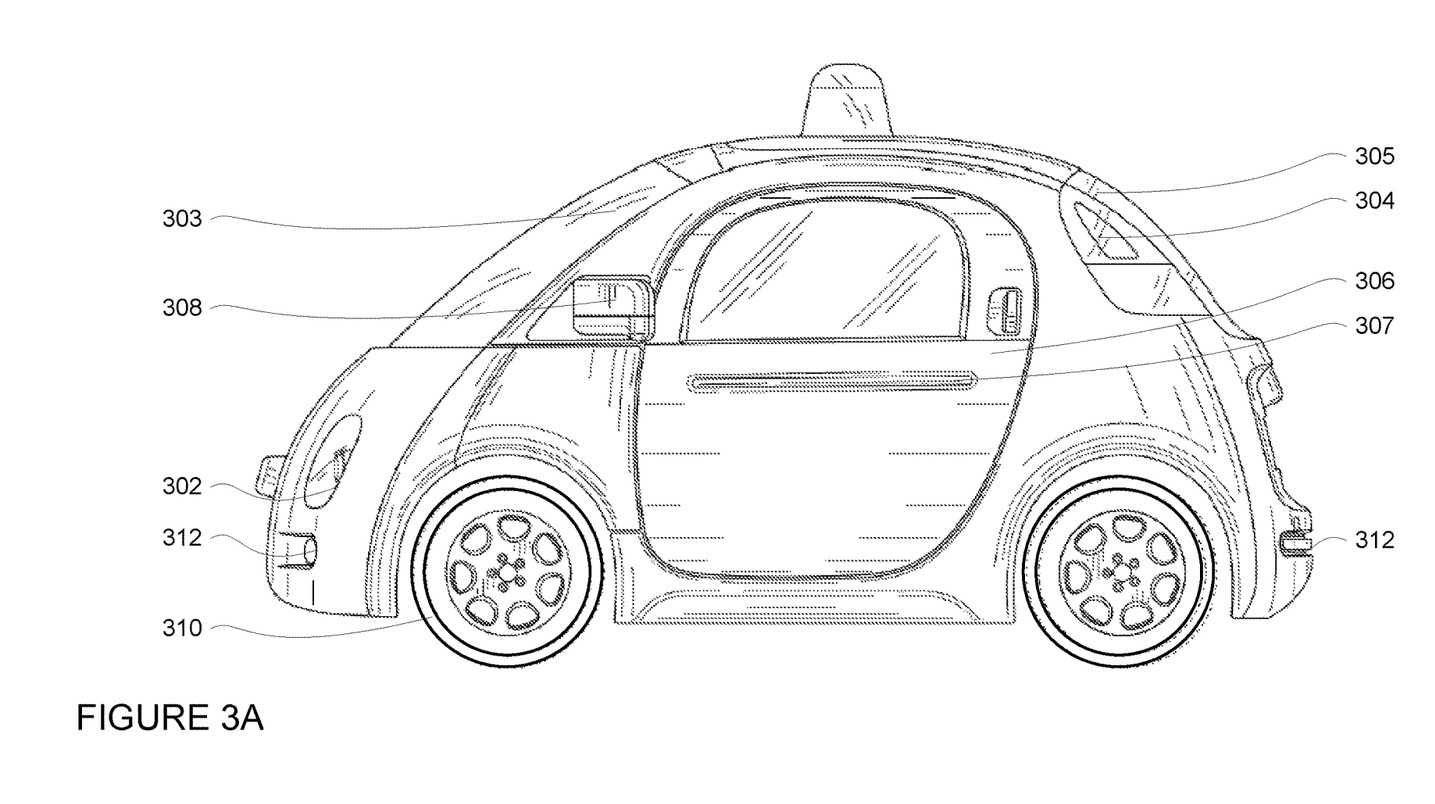
FIGS. 3A-3D are example external views of a vehicle in accordance with aspects of the disclosure.
Figures 3B, 3C:
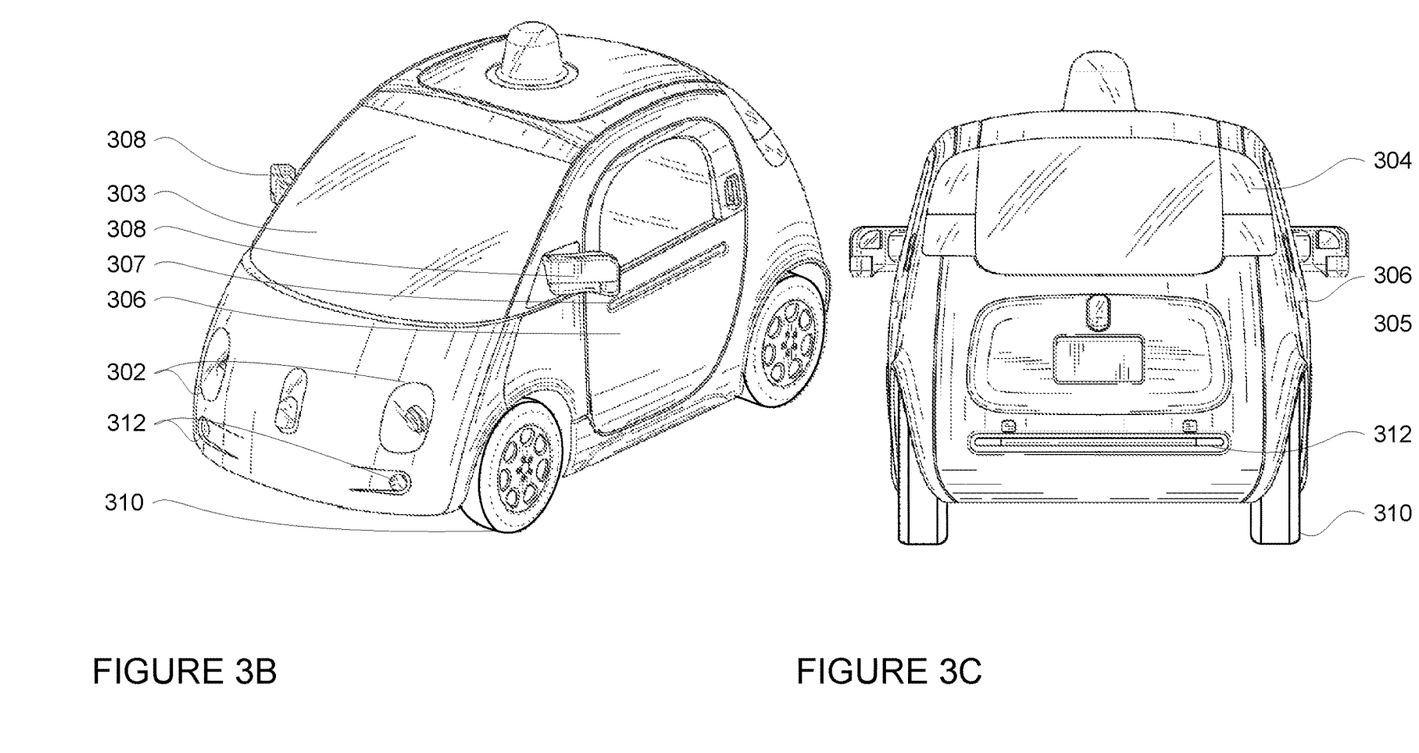
Figure 3D:
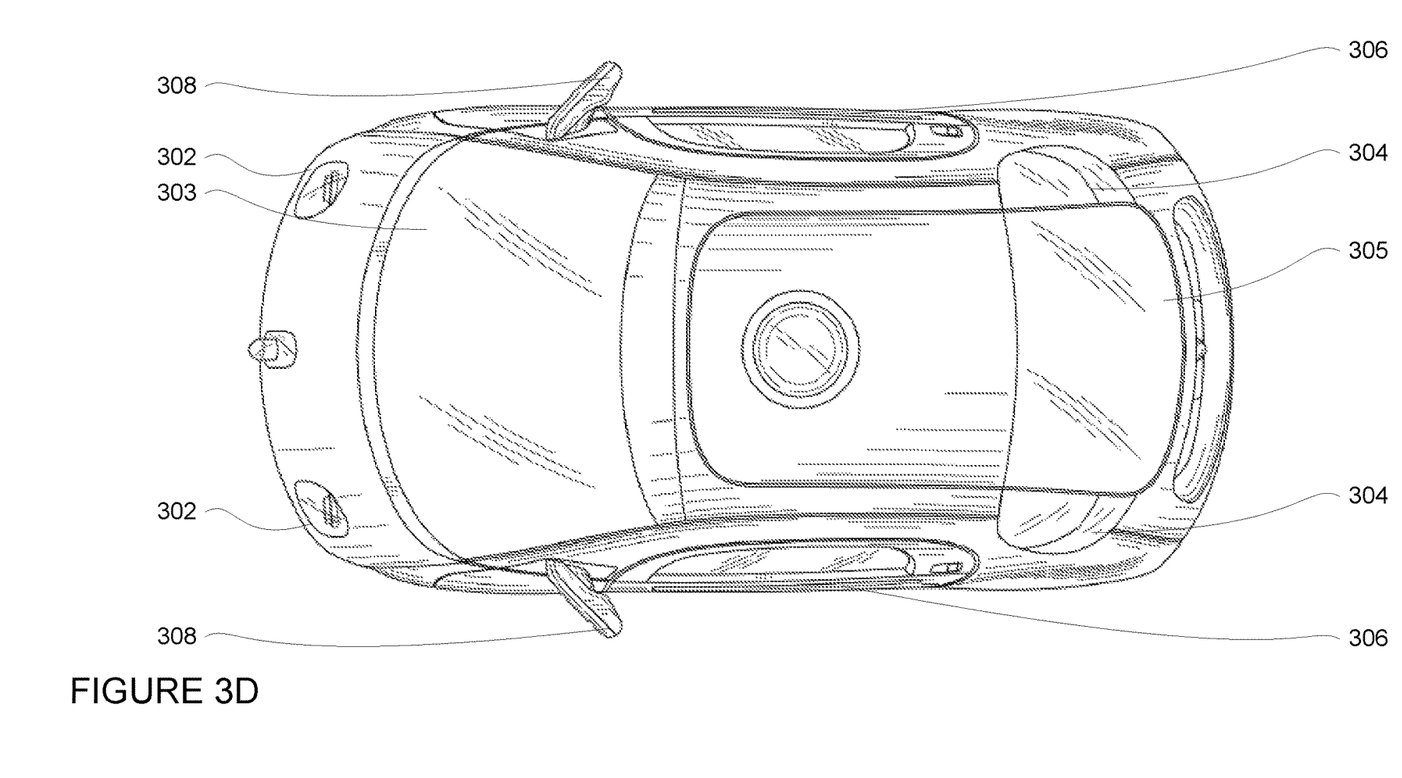

Computing device 110 of vehicle 100 may also receive or transfer information to and from other computing devices. FIG. 2 is a functional diagram, of an example system 200 that includes a removable manual control system 210 as well as vehicle 100. As shown in FIG. 2, the removable manual control system 210 may include one or more computing devices 220 having processors 222, memory 224, data 226 and instructions 228. Such processors, memories, data and instructions may be configured similarly to one or more processors 120, memory 130, data 132, and instructions 134 of computing device 110.

The removable manual control system 210 may include a plurality of user inputs. For example, the removable manual control system 210 may include a steering input 250 such as a steering wheel as well as a pedal assembly having brake pedal and acceleration pedal inputs 260 and 270, respectively. Each of the pedal and steering inputs may include one or more sensors configured to provide computing device 220 with information about the state of the respective input. For example, the steering input may include a sensor which provides information about the angle or orientation of the steering wheel, while the brake and acceleration pedal inputs may include sensors which provide information about whether and how much each pedal has been depressed.

The removable manual control system 210 may be powered by a power cable connection 230 with the vehicle's power system 174. In addition, the removable manual control system 210 may send and receive information with computing device 110. The information may be sent via one or more cabled (hard-wired) or wireless network connections 240. The network, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Figure 4:
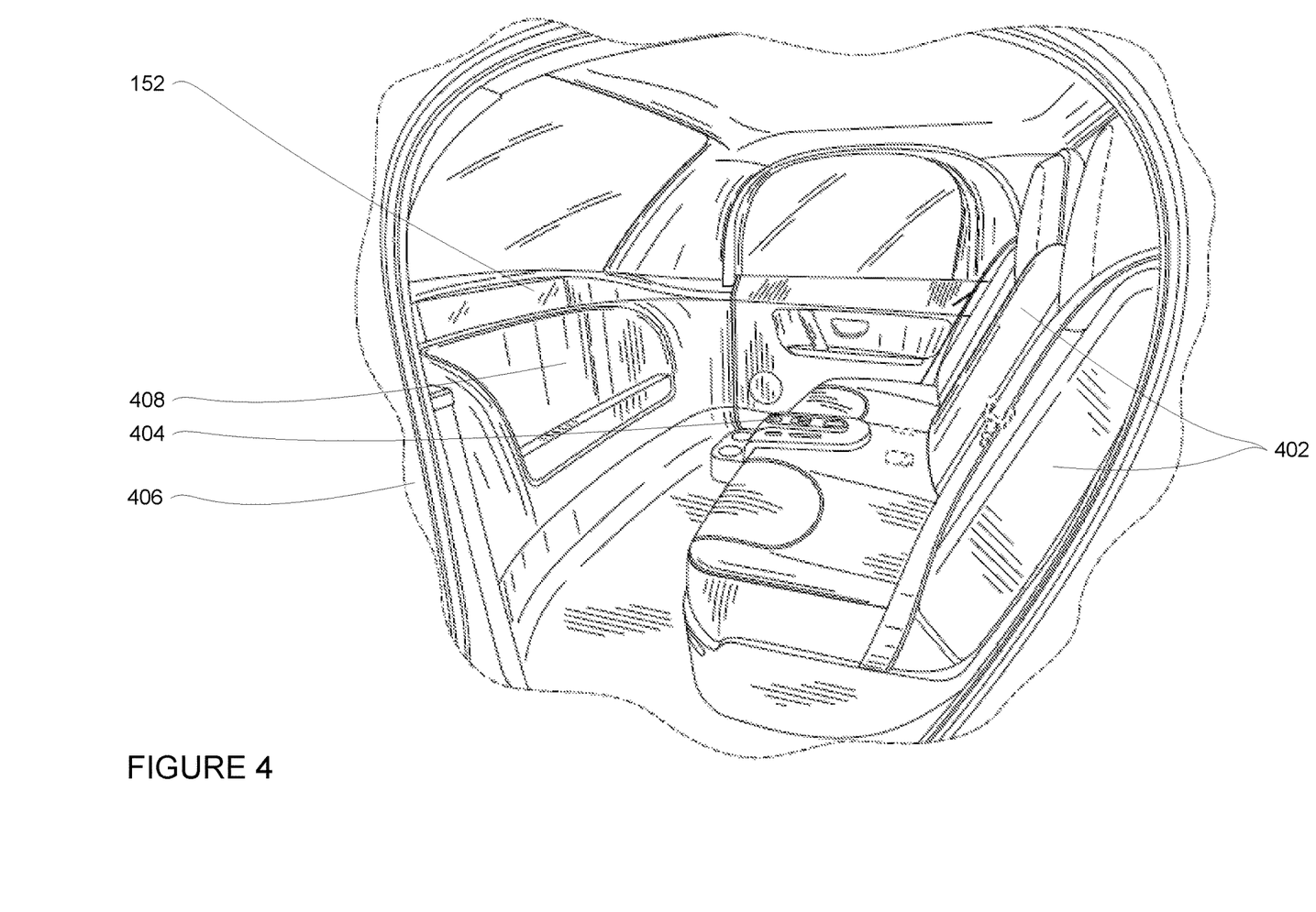
FIG. 4 is an example internal view of a vehicle in accordance with aspects of the disclosure.

FIG. 4 is an example internal view of vehicle 100 through the opening of door 306. In this example, there are two seats 402 for passengers with a console 404 proximate to them. As an example, proximate may include locations such as directly in front of a passenger seat of the vehicle, directly adjacent to (such as to the left or right of) a passenger seat, between two passenger seats, at least partially between two passenger seats, or any location near a passenger seat that allows a passenger to comfortably reach user inputs of the console.

Directly in ahead of the seats 402 is a dashboard configuration 406 having a storage bin area 408 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 404, and, if available, wireless network connections. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 5:
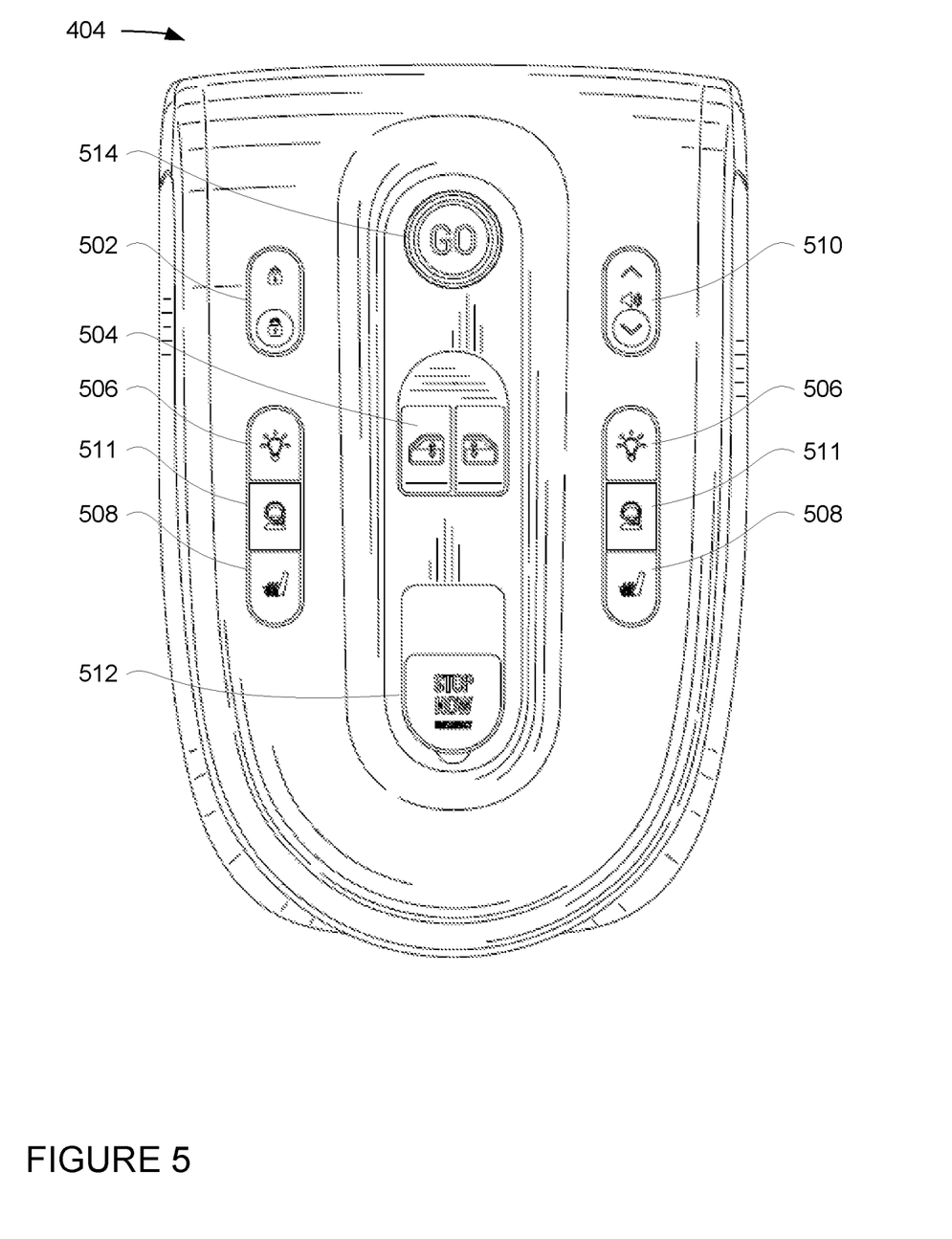
FIG. 5 is an example of a console of a vehicle in accordance with aspects of the disclosure.

FIG. 5 is a top down view of the console 404. Console 404 includes various buttons for controlling features of vehicle 100. For example, console 404 includes buttons that may be found in a typical vehicle such as buttons 502 for locking and unlocking the doors 306, buttons 504 for raising or lowering the windows of doors 306, buttons 506 for turning on internal lights of the vehicle, buttons 508 for controlling a heating function of seats 402, as well as buttons 510 for controlling the volume of speakers 154.

In addition, console 404 also includes buttons 511 for initiating communication with a remote concierge via a wireless network connection if available. Buttons 512 and 514 may also be a part of user input 150 and in this regard, allow a passenger to communicate with computer 110, for example, to initiate or end a trip in the vehicle. In this regard, button 512 may act as an emergency stopping button that, when pushed, causes vehicle 100 to stop in a short amount of time. Because the passenger does not have direct control of the acceleration or deceleration of vehicle 100 by way of a gas or brake pedal, button 512 may be an emergency stop button that is critical to allowing a passenger to feel safe and act quickly in case of an immediate emergency.

Button 514 may be a multi-function button. For example, button 514 may have three different states. In the first state, button 514 may be inactive, that is, if pressed, the vehicle's computer 110 would not respond by taking any particular action with regard to controlling the movement of the vehicle. In the second state, when the vehicle is ready to begin a trip, the button 514 may change to a "GO" button which a passenger uses to initiate a trip to a destination or drop off location. Once vehicle 100 is moving, button 514 may change to a third state, where the button 514 is a "PULL OVER" button which a passenger users to initiate a non-emergency stop. In this regard, computer 110 may respond by determining a reasonable place to pull the vehicle over, rather than coming to a more sudden stop as with the emergency stop button 512.

Thus, passenger communication with computer 110 for navigation purposes may be limited to button 514, emergency stopping button 512, a wireless network connection (such as Bluetooth LE) with the passenger's client computing device, and by sending information from the passenger's client computing device to a remote server which then relays that information to the vehicle's computer. In some examples, a passenger may provide information to the vehicle's computer 110 via voice commands though the microphone as discussed above. In addition, however, the passenger may communicate with the concierge via a phone call, an application on the passenger's client computing device, a microphone, and/or the concierge button 511 and in turn, the concierge may provide instructions control certain aspects of a vehicle via a concierge work station.

Figure 6:
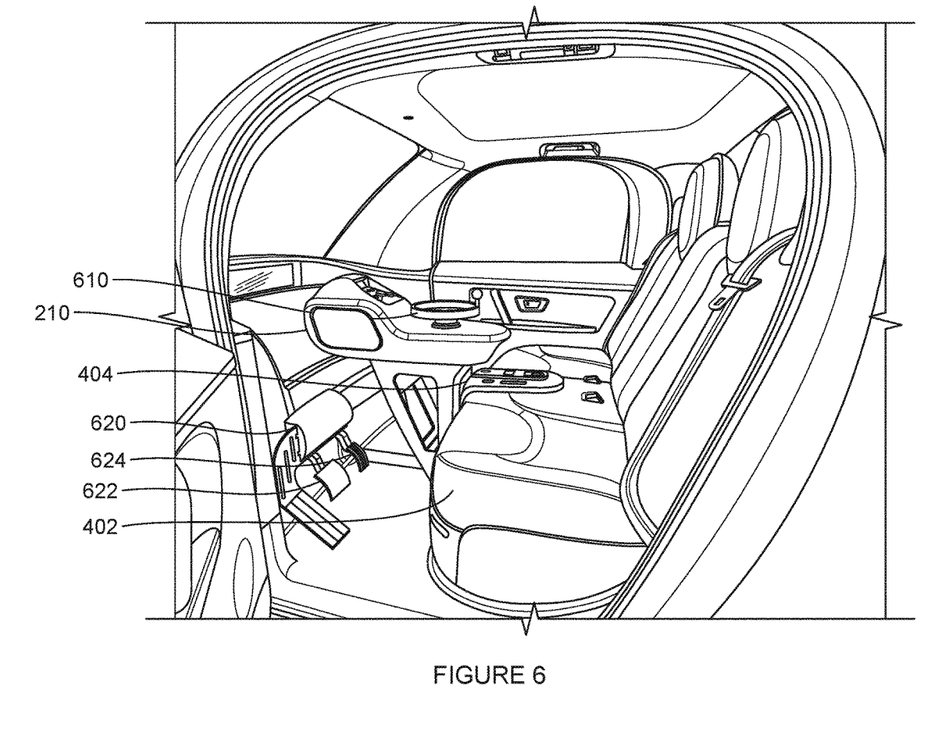
FIG. 6 is another example internal view of a vehicle in accordance with aspects of the disclosure.

FIG. 6 is a side view of the interior of vehicle 100 with a removable manual control system 210. In this example, the removable manual control system 210 includes a steering wheel 610 corresponding to steering input 250 that may enable a passenger to control the orientation of the vehicle's wheels.

In addition, the removable manual control system may also include a removable pedal assembly 620 that includes a brake pedal 622, corresponding to brake pedal input 260, and an acceleration pedal 624, corresponding to acceleration pedal input 270. The pedal assembly may enable a passenger to control the speed of the vehicle.

Figure 7A:
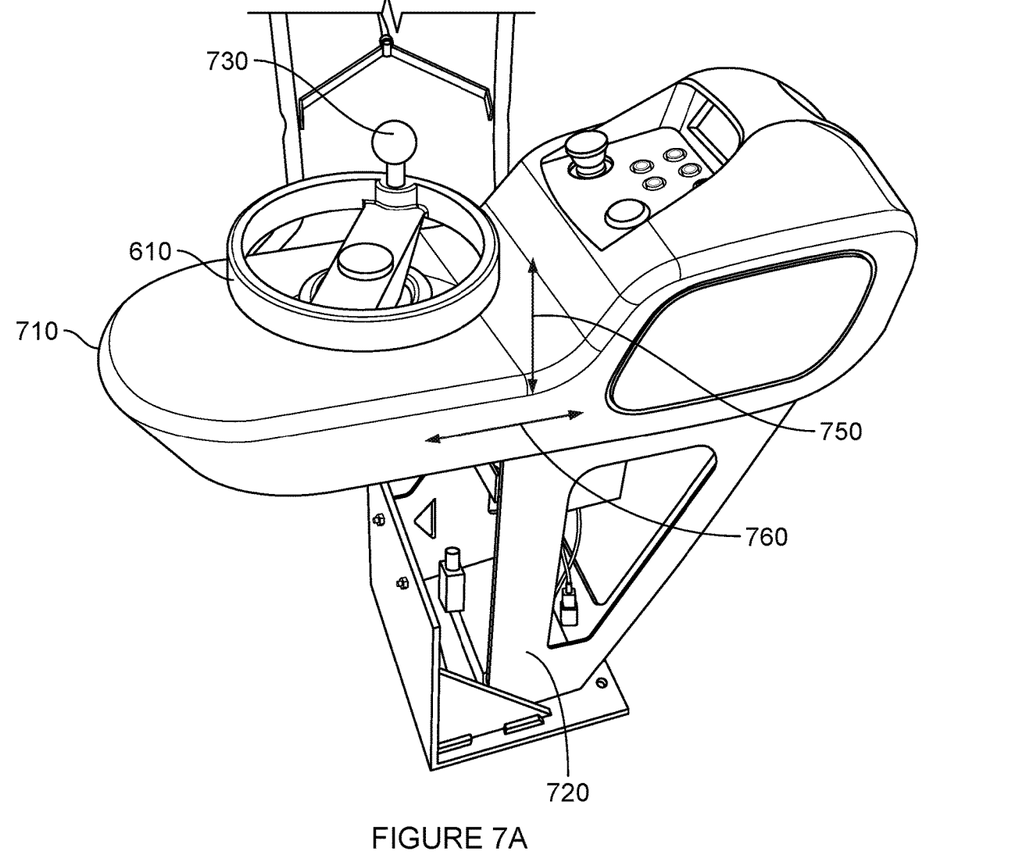
FIG. 7A is a perspective view of an example of a removable housing of a removable manual control system in accordance with aspects of the disclosure.

As shown in FIG. 7A, steering wheel 610 may be mounted in a steering wheel housing 710. The housing may sit on a base structure 720 that connects to the floor of the vehicle by a set of removable fasteners. When installed in the vehicle, the housing and base structure may be placed such that the housing is at least partially between two passenger seats 402 as shown in FIG. 6. The one or more computing devices of the housing may connect to the vehicle's computer via one or more networking cable and electrical connections (corresponding to one or more of power cable connection 230 and cable network connection 240) that extend from beneath the housing 710 and through the base structure 720 and connect with corresponding connections located below and between the seats of the vehicle (not shown).

Given the placement of the housing when installed in the vehicle, the steering wheel may be considered a center-mounted steering wheel. Testing has shown that passengers are easily and quickly able to adapt from a typical left hand drive steering wheel to the center mounted steering wheel such that reaction times with a center mounted steering wheel are commensurate with those of a typical left hand drive steering wheel. In addition, by placing the housing between the seats, the steering wheel is not located in front of a passenger. This eliminates the need for a five-point safety harness and an airbag system in the steering wheel during the testing.

The steering wheel 610 may be arranged to be generally horizontal. For example, the steering wheel may be positioned proximate to a horizontal plane or within some small angle from the horizontal plane (relative to the ground). This may provide for a more comfortable positioning of the passenger's arm when controlling the steering wheel and avoids the passenger having to hold his or her arm at an angle during the testing or bumping into the seats of the vehicle when turning the steering wheel.

Figure 7B:
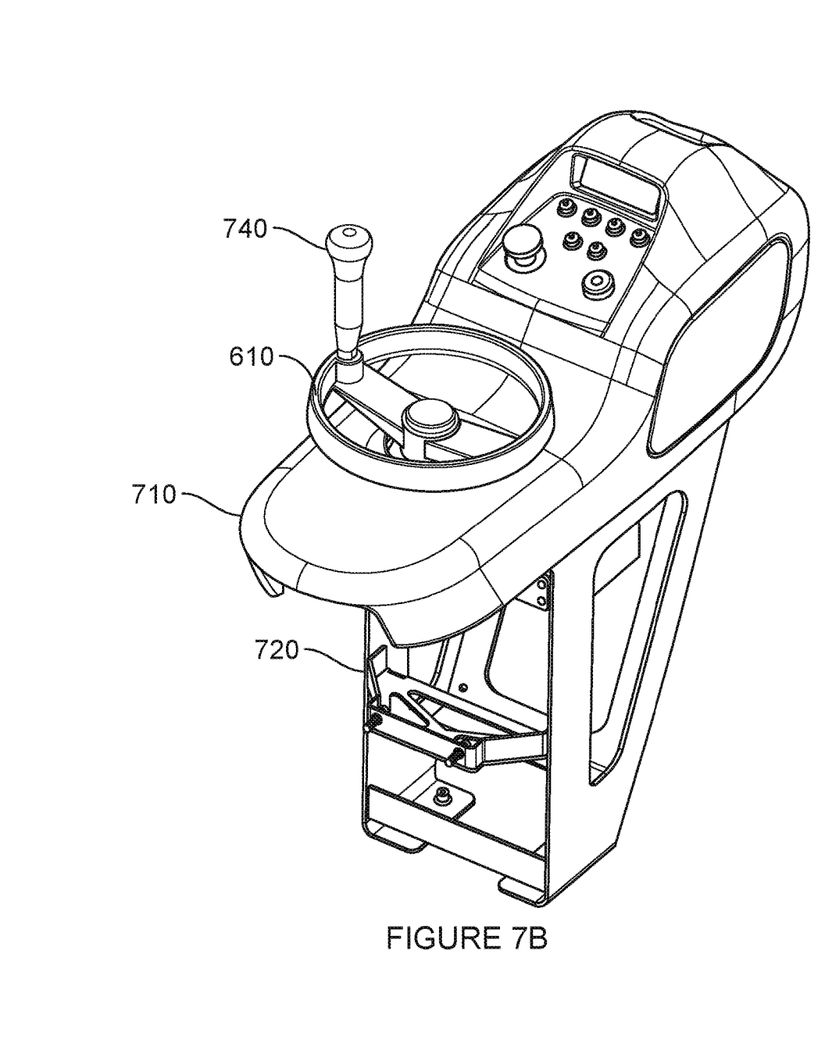
FIG. 7B is a perspective view of another example of a removable housing of a removable manual control system in accordance with aspects of the disclosure.

Given the center mounted positioning and the angle of the steering wheel, the steering wheel may also include a ball, knob, or other protrusion. As shown in FIG. 7A, knob 730 may allow a passenger to more easily manipulate the steering wheel by moving the knob. FIG. 7B provides an example of a peg 740 which could be used as an alternative to knob 730. In this example, only the protrusion has changed, housing 710 and base structure 720 are the same.

Because the vehicle is not adjustable, for example, the passenger seats are stationary, to increase the comfort of the passenger, the position of the housing 710 on the base structure 720 may be adjusted. For example, a passenger may move the housing up and down in the directions of arrow 750 as well as front and back (relative to the vehicle 100) in the directions of arrow 760. In one instance, the housing may move along one or more tracks of the base structure. This may allow for a position of the steering wheel which accommodates a wide variety of passenger sizes.

Figure 8B:
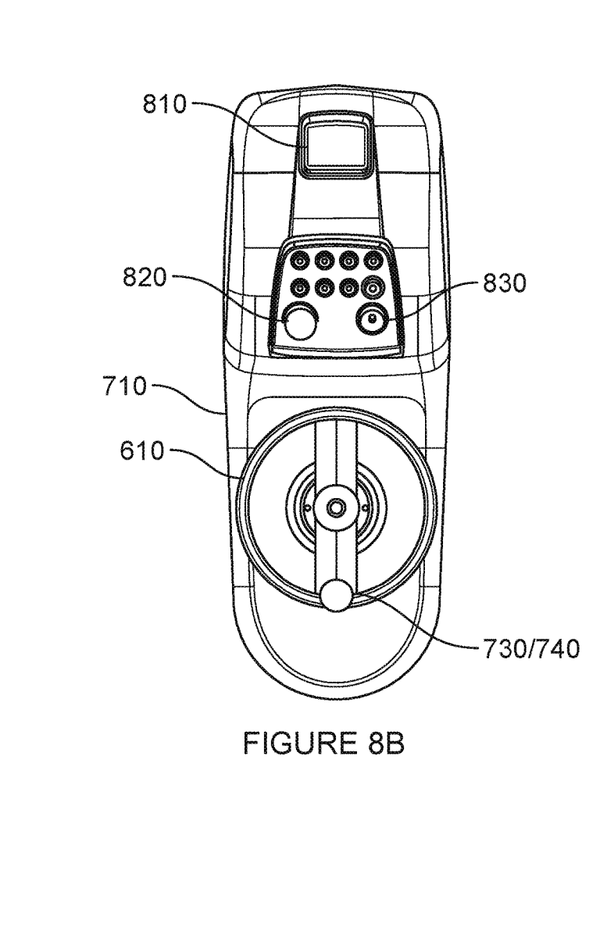
FIG. 8 is a top down view of the removable manual control system of FIG. 7A or FIG. 7B.

The housing may include features for providing information about the vehicle to a passenger. For example, as shown in FIG. 8, the housing 710 may include a screen 810 which displays information to the passenger. Such information may include basic statistics about the vehicle such as braking, steering, throttle, and battery conditions. More detailed information may not be necessary as the vehicle also includes a screen which provides information to passengers.

The housing may be shaped to fit over the console and between the two passengers. Because of this, the vehicle may safely and comfortably accommodate two passengers even when the housing is installed in the vehicle. In addition, the housing may have rounded edges and soft touch surface material to reduce injury and increase aesthetic appeal.

The placement of the housing over the console of the vehicle may make activation of some of the buttons of the console, and most importantly, the emergency stopping button difficult or inconvenient for passengers of the vehicle. Because of this, the housing may include redundant buttons which duplicate all of some of the features of the buttons of the console. For example, as shown in FIG. 8, buttons 820 and 830 may be redundant to buttons 512 and 514, respectively, of the console 404 and allow a passenger to communicate with computer 110, for example, to initiate or end a trip in the vehicle. However, rather than sending information direction to computing device 110, buttons 820 and 830 when activated may send a signal to computing device 220 which forwards the signal to computing device 110 for action with regard to the vehicle 100. In this regard, button 820 may be used to activate an emergency stopping function of vehicle 100 as described above with regard to button 512. Similarly, button 830 may be used to initiate or stop a trip as described above with regard to button 514.

Figure 9:
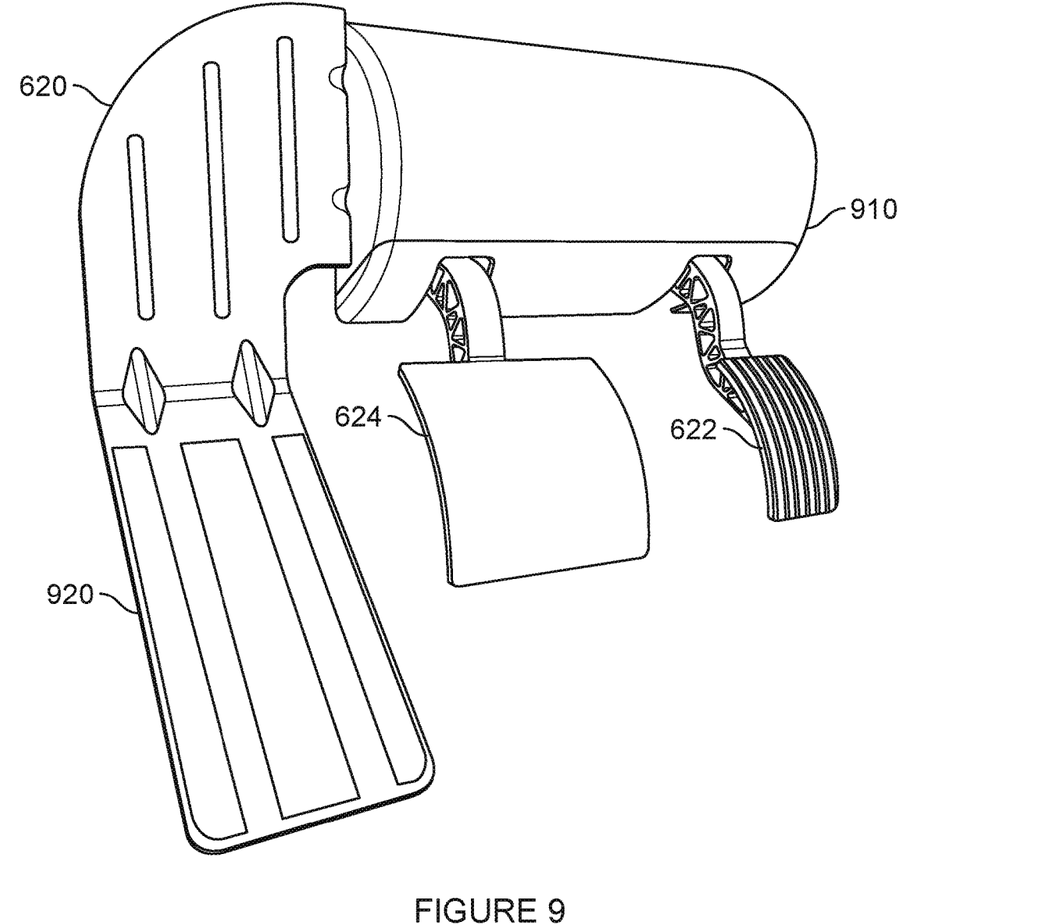
FIG. 9 is a perspective view of an example of a pedal assembly of a removable manual control system in accordance with aspects of the disclosure.

FIG. 9 is a detailed view of the removable pedal assembly 620. The pedals 622, 624 may be mounted on a support structure 910, which like the base structure of the housing, may be connected to the vehicle by a set of removable fasteners, such as bolts. As noted above, the pedals may include an acceleration pedal 624, a brake pedal 622, as well as a foot rest 920 for a passenger's left foot. The removable pedal assembly may also be reconfigured to suit right hand drive countries as well. Each pedal may include at least one sensor to detect when the pedal is activated by a passenger. Electrical cables from each of the pedals may be used to connect the sensors of the pedals to the computing device 220 (not shown). The pedals may be mounted to the floor or an area of the interior of the vehicle which is convenient to the feet of a passenger who would need to control the vehicle during testing as shown in FIG. 6.

Figure 10A:
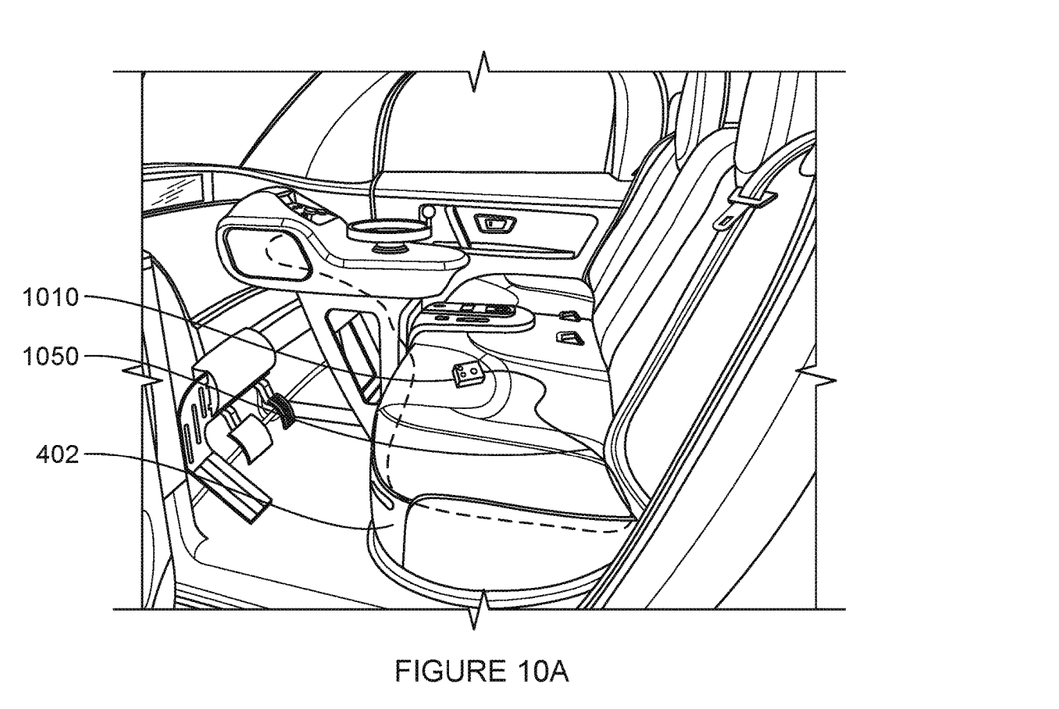
FIG. 10A is another example internal view of a vehicle in accordance with aspects of the disclosure.
Figure 10B:
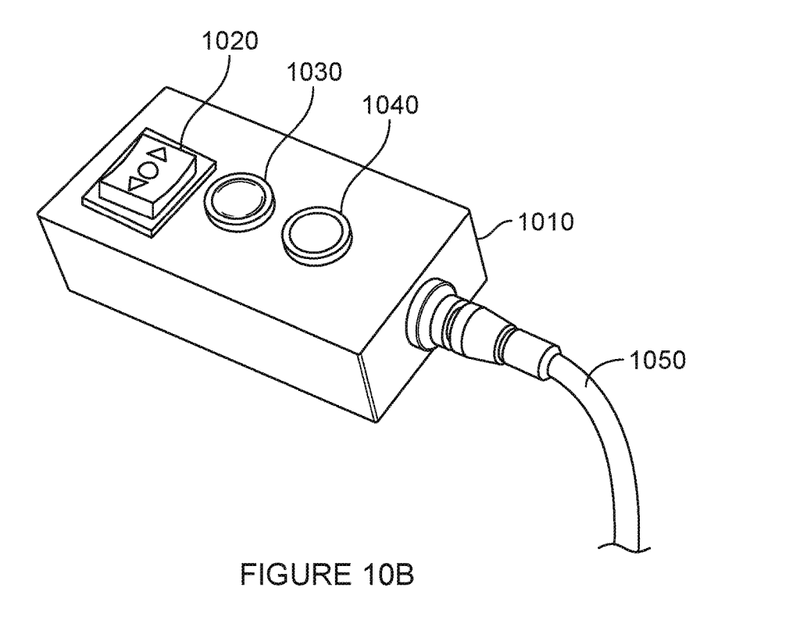
FIG. 10B is an example of a hand held wand in accordance with aspects of the disclosure.

As noted above, in addition to the steering wheel and pedals, the removable manual control system may also include a hand held wand 1010 shown in FIGS. 10A and 10B. The wand may include additional inputs that would be useful and important to a passenger but would otherwise be unnecessary in the autonomous driving mode. For example, the wand may include a turn signal switch 1020, an on/off button for the manual or automatic driving mode 1030, as well as a horn button 1040. The wand may be held in a passenger's hand during testing thereby allowing for quick and easy access to such inputs by a passenger.

Cable 1050 can be used to provide power and data from the computing device 210 to the wand 1010. Dashed line 1050 of FIG. 10A represents an example path of the cable 1050 through one of the seats 402. When activated, these inputs send signals to the computing device 220 via the cable 1050, which in turn forwards the signals to the computing device 110 for action relative to the vehicle 100.

When installed in a vehicle, the removable manual control system may be configured to receive input at the steering wheel and send information about the angle of the steering wheel to the vehicle's computing device. For example, when a passenger is ready to take control of the vehicle and switch the vehicle from an autonomous driving mode to an emergency manual driving mode, the passenger may use the protrusion 730 to manipulate the position of the steering wheel 610. The steering wheel angular position sensor may send information identifying angle of the steering wheel to the computing device 220. The computing device 220 may then send information identifying the angle of the steering wheel to the computing device 110. In response, the computing device 110 may send commands or otherwise control the wheels of the vehicle to orient the wheels according to the angle of the steering wheel.

Similarly, the passenger may be able to control the braking and acceleration of the vehicle using the pedals. For example, when a passenger is ready to take control of the braking or acceleration of the vehicle, the passenger may press his or her foot on the brake or acceleration pedals to manipulate the speed of the vehicle 100. If the brake pedal is depressed, the brake pedal sensor may send information identifying the position of the brake pedal to the computing device 220. The computing device 220 may then send information identifying the position of the brake pedal to the computing device 110. In response, the computing device 110 may send commands or otherwise control the speed of the wheels of the vehicle to corresponding to the position of the brake pedal.

Similarly, if the acceleration pedal is depressed, the acceleration pedal sensor may send information identifying the position of the acceleration pedal to the computing device 220. The computing device 220 may then send information identifying the position of the acceleration pedal to the computing device 110. In response, the computing device 110 may send commands or otherwise control the speed of the wheels of the vehicle to corresponding to the position of the acceleration pedal.

During an emergent or other situation where a passenger needs to take control of the vehicle, the manual driving mode may be activated in various ways. For example, the passenger may use the inputs of the wand or the housing, tap on the brake or acceleration pedals, or move the steering wheel. In response, the computing device 220 may determine that the vehicle should switch to the manual driving mode and begin sending information to the computing device 110 for controlling the vehicle 100 as described above. In addition, the inputs of the wand, such as on/off button 1030, may allow a passenger to switch the vehicle back to the autonomous driving mode. Thus, the versatile nature of the removable manual control system further increases the safety and usefulness of the system.

Although the examples above relate to a particular configuration for the removable manual control system, various other arrangements and features may be used to increase safety and comfort of the passengers testing the vehicle. For example, rather than using a steering wheel with a knob or other protrusion, a joystick configuration may be used. In this regard, the joystick may be moved to control the steering of the vehicle and change the orientation of the wheels as described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A removable manual control system for testing an autonomous vehicle having an autonomous driving mode, the system comprising:
   a removable housing configured to be mounted proximate to one or more passenger seats in the vehicle, the removable housing having an electronic connection to a computer system of the vehicle, and the removable housing has at least one emergency stopping button redundant to an emergency stopping button of the vehicle;
   a steering input mounted in the removable housing at an orientation proximate to a horizontal plane, the steering input being configured to allow a passenger to control a direction of movement of the vehicle in manual driving mode; and
   one or more computing devices having one or more processors configured to receive input from the steering input and send corresponding instructions to the computer system of the vehicle.

2. The system of claim 1, wherein the removable housing is positioned on a base structure that connects to a floor of the vehicle by a set of removable fasteners.

3. The system of claim 2, wherein the removable housing is movable relative to the base structure in a horizontal direction and also a vertical direction.

4. The system of claim 1, wherein the removable housing is configured to rest above the emergency stopping button of the vehicle.

5. The system of claim 1, wherein the removable housing further includes a screen for displaying information to the passenger.

6. The system of claim 1, further comprising a removable pedal assembly configured to allow the passenger to control a speed of the vehicle.

7. The system of claim 6, wherein the removable pedal assembly is configured to connect to an interior of the vehicle by a set of removable fasteners.

8. The system of claim 1, further comprising a hand held wand configured to allow the passenger to control turn signals of the vehicle.

9. The system of claim 1, further comprising a hand held wand configured to allow the passenger to activate the manual driving mode.

10. The system of claim 9, wherein the hand held wand is further configured to allow the passenger to activate the autonomous driving mode.

11. The system of claim 1, wherein the steering input is a steering wheel having a protrusion that allows the passenger to manipulate a position of the steering wheel.

12. An autonomous vehicle having an autonomous driving mode, the vehicle comprising:
   no permanent steering wheel and no user inputs for steering, acceleration, and deceleration of the vehicle other than a set of user input buttons including an emergency stopping button to control a stopping function of the autonomous vehicle in the autonomous driving mode; and
   a removable manual control system for testing the autonomous vehicle, the removable manual control system having steering, acceleration, and braking inputs as well as at least one emergency stopping button redundant to the emergency stopping button of the set of user input buttons.

13. The vehicle of claim 12, further comprising one or more seats, wherein the removable manual control system includes a housing for the steering input and the housing is placed proximate to the one or more seats.

14. The vehicle of claim 13, wherein the housing is positioned on a base structure that connects to a floor of the vehicle by a set of removable fasteners.

15. The vehicle of claim 14, wherein the housing is movable relative to the base structure in a horizontal direction and also a vertical direction.

16. The vehicle of claim 13, wherein the housing is configured to rest above the emergency stopping button of the set of user input buttons.

17. The vehicle of claim 12, wherein the removable manual control system further includes a removable pedal assembly in which the acceleration and braking inputs are mounted.

18. The vehicle of claim 17, wherein the removable pedal assembly is configured to connect to an interior of vehicle by a set of removable fasteners.

19. The vehicle of claim 12, wherein the set of user input buttons further includes a button for initiating the autonomous driving mode.

20. A system comprising:
   an autonomous vehicle having an autonomous driving mode; and
   a removable manual control system for testing the vehicle, the removable manual control system comprising:
      a removable housing configured to be mounted proximate to one or more passenger seats in the vehicle, the removable housing having an electronic connection to a computer system of the vehicle, and the removable housing has at least one emergency stopping button redundant to an emergency stopping button of the vehicle;
      a steering input mounted in the removable housing at an orientation proximate to a horizontal plane, the steering input being configured to allow a passenger to control a direction of movement of the vehicle in manual driving mode; and
      one or more computing devices having one or more processors configured to receive input from the steering input and send corresponding instructions to the computer system of the vehicle.

* * * * *